United States Patent [19]
Wunning et al.

[11] Patent Number: 5,693,131
[45] Date of Patent: Dec. 2, 1997

[54] DECOMPOSABLE AND COMPOSTABLE NATURAL SUBSTANCE GRANULATES FROM PRIMARILY LATE GROWTH RAW MATERIALS

[75] Inventors: Paul Wunning, Zum Hebsack 3, D-78244 Gottmadingen; Marcus Wunning, Ebersbach, both of Germany

[73] Assignee: Paul Wunning, Germany

[21] Appl. No.: 618,534

[22] Filed: Mar. 19, 1996

[51] Int. Cl.$^6$ .................................................. C08L 89/00
[52] U.S. Cl. .................... 106/123.12; 106/154.4; 106/156.1; 106/156.2; 106/137.1; 106/137.6
[58] Field of Search ................. 106/123.12, 154.4, 106/156.1, 156.2, 137.6, 137.1

[56] References Cited

U.S. PATENT DOCUMENTS

| | | | |
|---|---|---|---|
| 1,848,981 | 3/1932 | Wallace | 106/123.12 |
| 2,260,557 | 10/1941 | Burton | 106/123.12 |
| 2,534,908 | 12/1950 | Holzer | 106/123.12 |
| 3,619,222 | 11/1971 | Werle et al. | 106/123 |

FOREIGN PATENT DOCUMENTS

| | | |
|---|---|---|
| 2029727 | 5/1992 | Canada . |
| 2715501 | 10/1978 | Germany . |
| 3827061 | 2/1990 | Germany ............... C09H 9/04 |
| 58-111625 | 7/1983 | Japan . |
| 58-134135 | 8/1983 | Japan . |
| 51144458 | 12/1994 | Japan . |
| 250077 | 5/1948 | Switzerland . |

OTHER PUBLICATIONS

Chemical Abstracts, vol. 118, No. 8, 22 Feb. 1993.
"Developments in the Production of Biomassed Fiber/Plastic Alloys" of Polymer Material Science Engineering, vol. 67, (1992) no month available, pp. 461 to 462.
English Abstract of JP 51–14458 (Dec. 1976).
Abstract of CA 029727 (May 1990).
English Abstract of JP 58–134135 (Aug. 1983).
English Abstract of JP 58–111625 (Jul. 1983).

*Primary Examiner*—David Brunsman
*Attorney, Agent, or Firm*—Ladas & Parry

[57] ABSTRACT

A natural substance granulate, produced from alkali-lignin and proteinaceous material and optionally additives such as fillers, plasticisers, dye pigments, air entraining agents and flexibilisators is described. A method for the production and the processing of the inventive natural substance granulate to produce molded articles is also described.

19 Claims, 1 Drawing Sheet

1 = EXTRUDER WITH APPARATIVE ARRANGEMENT
2 = CONDITIONING ZONE WITH APPARATIVE ARRANGEMENT
3 = GRANULATING MACHINE WITH APPARATIVE ARRANGEMENT
4 = STORAGE RESERVOIR WITH APPARATIVE ARRANGEMENT FOR
4a = THERMOPLASTIC PROCESSING WITH APPARATIVE ARRANGEMENT
4b = BAGGING/PACKING WITH APPARATIVE ARRANGEMENT

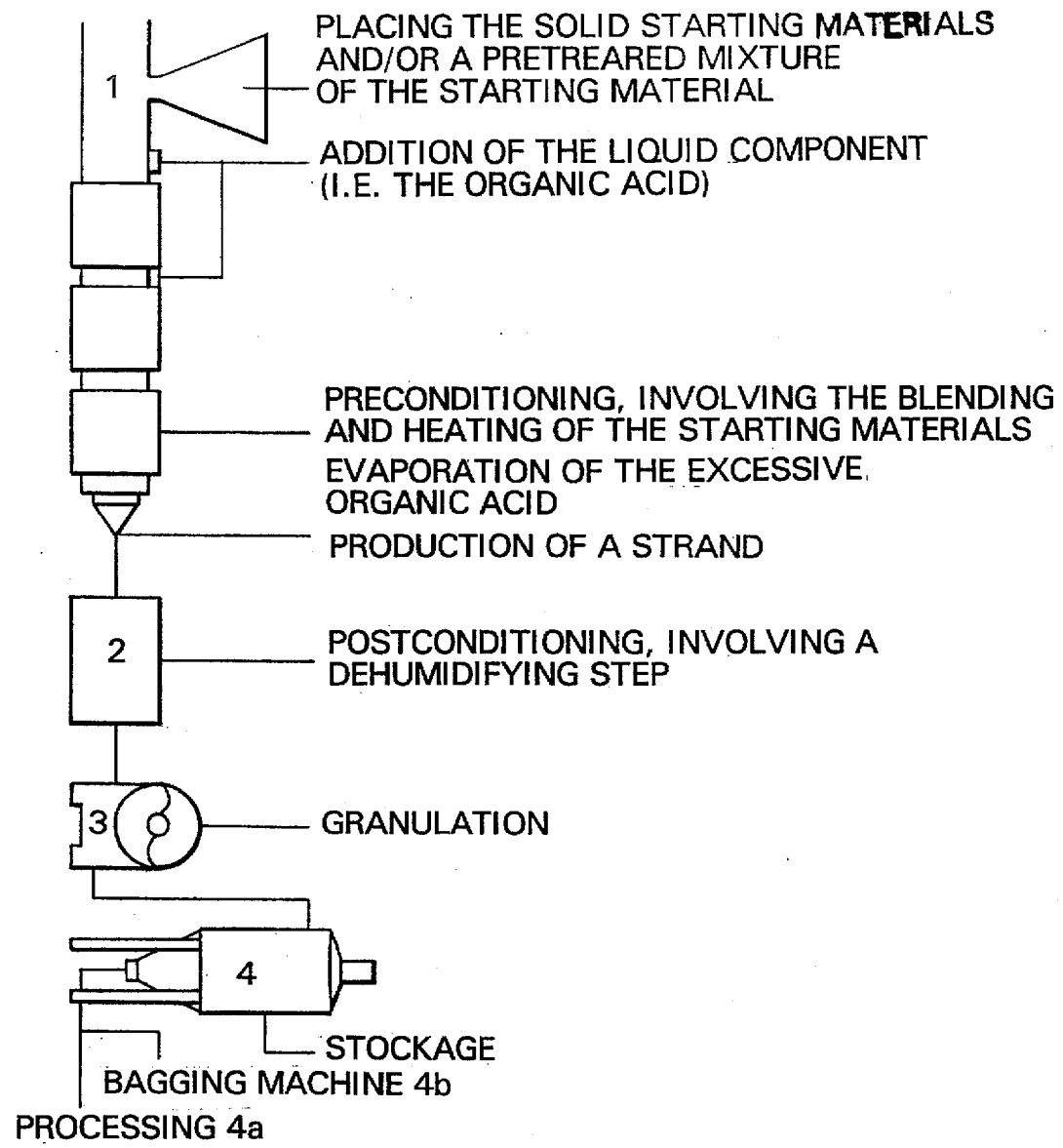

DECOMPOSABLE AND COMPOSTABLE NATURAL SUBSTANCE GRANULATES FROM PRIMARILY LATE GROWTH RAW MATERIALS

FIELD OF THE INVENTION

The invention relates to decomposable and compostable natural substance granulates from primarily renewable, i.e. late growth raw materials, which can be used for the production of molded articles, e.g. by means of thermoplastic injection molding, as well as a method for the production thereof.

BACKGROUND OF THE INVENTION

Molded articles, commodities and industrial raw materials are currently produced from essentially synthetic materials, i.e. from raw materials which basically consist of synthesized organic polymers. According to the requirements, the selection of the components as well as the reaction conditions, a variety of elastomers, thermosetting plastics and thermoplastics have been manufactured. Although synthetic materials, have advantages such as easy molding and economical workability for mass production as well as their availability at low cost, a series of problems are also linked to their widespread use. Synthetic materials are used in many cases for the production of a variety of short lived goods and present a serious problem with respect to waste disposal. These materials are also linked with considerable problems and costs when it comes to the separation of the individual synthetic materials for recycling. Finally, there is the fundamental issue of the finiteness of the natural oil reserves, which form the basis for the manufacturing of synthetic plastics.

As a result, an increasing activity has been emerging in recent years to look for more ecological materials, i.e. biologically decomposable or compostable materials, having material properties being equivalent to those of the synthetic plastics. In particular, biologically synthesized polymers like cellulose, starch, proteins etc., having the advantage of being late growth raw materials or renewable materials, i.e. materials which can be grown and biologically decomposed or composted without adversely affecting the environmental balance, are of particular interest. Natural polymers being compostable are of an overriding interest, because they can be decomposed in a relatively short period of time, usually with the concomitant formation of heat, preferably aerobically, without leaving any remains. This is in contrast to biologically decomposable materials, which require more time, rather anaerobic conditions and which decompose only to an extent of about 60%, i.e. they leave more or less remains.

In the area of late growth or renewable raw materials, materials based on modified natural raw materials have been known for quite some time. Thermosetting plastics from casein-plastics as well as thermoplastics from cellulose nitrates, cellulose acetates, cellulose esters and cellulose ethers are well known in the art. Corresponding molded articles from granulates based on commer-marketed cellulose derivatives are for instance under the name "Bioceta". High-quality natural substance plastics based on starch have been introduced in the market, particularly by the "Novon Polymers AG/Warner-Lambert company". The corresponding disclosure of the technical teaching for the production of molded articles from natural substance polymers can be found among others in the patent specifications of EP-90 600 and DE-3827061/C1.

The known natural substance plastics based on proteins (e.g. gelatine or casein) and polysaccharides (e.g. cellulose derivatives or starch) display, however, some considerable disadvantages, e.g. their considerable sensitivity to moisture, stemming from their propensity to strongly absorb water (hygroscopicity) which increases with the addition of plasticisers. Thus, such natural plastics lose their natural stability, particularly synthetic plastics. Furthermore, high processing temperatures (>180° C.) are required for their production, thus leading to a high energy consumption. Finally, the material costs are ultimately between 10 to 15 times higher than those for synthetic plastics, so that the natural plastics are considered by the market as being too expensive.

A further known natural starting material for obtaining corresponding natural substance plastics are some lignin derivatives. In U.S. Pat. No. 3,619,222 a modified protein base adhesive composition comprising a protein, a polyhydric compound and a lignin extract (lignosulfonate) is disclosed. The compositions according to U.S. Pat. No. 3,619,222 are useful as natural adhesives, glues (e.g. hot-melts) displaying basically thermosetting and water-insoluble properties.

In CH-250077 a method for the production of molded articles is disclosed whereby sulfit waste liquor (a sulfonated lignin product from the lignin extraction) is treated with proteins, thus providing an elastomeric, tacky mass which is dried and hardened by means of suitable hardeners.

Although both documents U.S. Pat. No. 3,619,222 and CH-250077 disclose compositions based on natural starting materials, the starting materials themselves as well as the final products do not have the requisite thermoplastic properties and require suitable hardeners and other chemical compounds in order to obtain a material suitable for molding.

SUMMARY OF THE INVENTION

Accordingly, it is an object of the present invention to provide a compostable natural thermoplastic granulate (i.e. a decomposable and compostable natural substance granulate which leaves no remains) based on renewable, i.e. late growth raw materials, allowing a relatively low-energy thermoplastic processing thereof in traditional processing machines. It is a further object of the present invention to provide a material with largely variable parameters, like the density of the material, without losing the compostability of the final molded article. It is still another object of the present invention to provide a natural substance granulate which in addition to its ecological advantages, is an economically competitive product compared to the synthetic plastic granulate. A further object of the present invention is to provide a method for the manufacturing of such a granulate. It is finally also an object to provide molded objects manufactured from such granulates.

It was surprisingly found that a natural substance granulate based on a mixture of alkali-lignin and a protein or a protein derivative, having been subjected to a stereochemical modification by means of a treatment of the alkali-lignin and the protein or protein derivative with an organic acid, provides the requisite thermoplastic properties for a corresponding thermoplastic processing. The alkali-lignin is a product extracted from cellulose and is formed by treatment of wood with NaOH, thus forming lignin acid (lignate). The stereochemical modification is performed through a time-reaction which involves an organic acid that converts the tertiary structure of the alkali-lignin and the protein derivatives or proteins to a thermoplastic secondary structure, so that a natural substance granulate with thermoplastic properties can be obtained.

BRIEF DESCRIPTION OF THE DRAWING

The FIGURE represents a schematic illustration of the steps which are involved in the process of manufacturing the natural substance granulate by means of the alkali-lignin and the protein derivative or protein according to the invention whereby a stereochemical modification is performed by means of a time reaction involving the use of an organic acid.

DETAILED DESCRIPTION OF THE INVENTION

Lignin is a highly molecular, aromatic (poly-phenolic) macromolecule which fills the cavities between the cell membranes in lignifying plants, thus leading to wood. By extracting cellulose, the corresponding lignin derivatives, depending on the method of extraction, become available in large quantities as secondary products. The alkali-lignin of the present invention is obtained by alkaline extraction. It has a more phenolic character than other lignin derivatives and can be used in this present invention in the form of a powder or dissolved, for example in divalent alcohols (e.g. glycol).

The protein derivative can be a simple galatine-hydrolysate, i.e. a collagen obtained from acidic boiling. In a preferred embodiment, proteids, particularly phosphoproteid (e.g. casein) are used as a protein derivative source. Phosphoproteids contain in addition to a protein moiety, a phosphoric acid moiety in the form of an ester, as a prosthetic group. The spheroproteins, scleroproteins, as well as the proteids modify the 3-dimensional tertiary structure, which is formed through a variety of interactions, e.g. disulphide bridges, dispersion interactions, coulomb interactions and particularly the inter- and/or intramolecular hydrogen bonds but do not change the necessary thermoplastic properties required for the desired natural substance granulate. The same is true for the alkali-lignin, which also displays a 3-dimensional cross-linked structure and therefore belongs to the thermosetting plastics rather than to the thermoplastics. As a result, the alkali-lignin and the protein or protein derivatives need to be subjected to a stereochemical modification, which converts the 3-dimensional tertiary structure to a 2-dimensional thermoplastic secondary structure. This objective is realized by an acidic preconditioning of the mixture of alkali-lignin derivatives and the proteins or protein derivatives. This treatment consisting of bringing, together at a temperature of between 20° C. and 90° C. and pressures of between 0.1 and 60 bar, the optionally alkaline, water insoluble starting materials with an organic acid, e.g. acetic acid for a time-reaction, thus forming an emulsion having a pH of about 3 to 6. After the performed time-reaction, i.e. after the the stereochemical modification has occured, the products are precipitated and thereafter transformed into a molten mass. The temperature and pressure depend essentially on the organic acid which is used, the concentration and the quantity thereof. The modified form of the alkali-lignin, as well as of the protein or protein derivative is produced during the time-reaction which can take between 45 and 420 seconds.

In a preferred embodiment, the protein derivative and 15 to 70% by weight of the alkali-lignin is mixed with acetic acid (0.5–20%) at a reaction temperature of between 80° to 85° C., for the time reaction whereby the hydrogen bonds, which are responsible for the tertiary structure, are broken up and the desired secondary structure is obtained. Depending on the requirements with respect to the natural substance granulate (e.g. the desired processing temperature of the natural substance granulate for the thermoplastic molding procedure), varying amounts of proteins or protein derivatives are blended with the alkali-lignin during the thermoplastic transformation, i.e. for natural substance granulates for which a low melting point is desired, larger amounts of proteins or protein derivatives need to be added as a sort of eutectic partner lowering the melting point of the final granulate. Optionally, exothermic air entraining agents (e.g. expanding agents on the basis of bicarbonates) in an amount of 0.1 to 2.5% by weight, flexibilisators (e.g. caoutchouc, particularly natural latex) in an amount of 1 to 40% by weight, fillers (preferably mechanically pretreated natural fibers, like $C_4$-plants) in an amount of 0.5 to 50% by weight, natural dye pigments (in order to provide a coloration) in an amount of 0.05 to 10% by weight and plasticisers (water or alcohols) in an amount of 1 to 20% by weight are also added. Since the alkali-lignin can be used in solution with secondary alcohols (e.g. glycol), the plasticiser is present right from the beginning. The inorganic extenders (e.g. chalk, talcum, silica) can be employed, as fillers. Having regard to biological decomposition, in particular, compostability, the organic vegetal fillers, like straw-fibers, conifer-extracts (devoid of the bark), particularly sedge, are preferred.

Still concerning the preferred embodiment, after having blended the above mentioned starting materials and after the time reaction taking between 45 to 420 seconds at a reaction temperature of between 80° to 85° C. (preconditioning), the natural substance granulate according to the invention is produced in the ensuing step by methods which are known to the man of skill in the art, e.g. in an extruder. The processing temperature prior to the extrusion is increased to at least 90° C. (between about 90° to about 120° C., not more than about 125° C.) so that the excessive acetic acid is evaporated and a homogeneous molten product is forming. The molten product is afterwards pressed through an injection nozzle at a pressure of between 50 and 500 bars (depending on the amount of the natural fibers) and is solidified after conditioning to a semi-finished product (continuous casting by postconditioning involving a de-humidifying step) which can be processed to a granulate by means of a mechanical grinding machine.

The natural substance granulate, thus formed, behaves like a synthetic thermoplastic and can be processed according to known methods (e.g. injection molding) at temperatures of between about 90° C. and 130° C. for the production of any kind of molded articles (e.g. rottable flower-pots, one-way objects etc.). For the production of molded articles having a low density, it is important that the air entraining agent is incorporated into and equally distributed within the granulate. Furthermore, it is of utmost importance that the reactivity of the air entraining agent is activated by processing temperatures. higher than the reaction reaction temperatures (which are between 20°–90° C.). Thus, the air entraining reaction is only activated on manufacturing the molded articles at higher temperatures and is endothermic.

Although the order in which the starting materials are added and mixed together, i.e. the alkali-lignin, the proteins or the protein derivatives (e.g. casein), the organic acid (e.g. acetic acid) and optional additives, like a filler (e.g. sedge fibers) is not critical to enable the man of skill in the art to carry out the present invention, in the most preferred embodiment, a filler (e.g. the sedge fibers) is blended first with acetic acid, thus forming a saturated suspension.

Thereafter, the protein derivative (e.g. casein) is added and finally the alkali-lignin is added. The entire mixing procedure takes about 6 minutes and the resulting emulsion is thorougly mixed at a temperature of between 80° to 85° C., for a reaction time of between 45 to 420 seconds during which the tertiary structure is modified (preconditioning).

The natural substance granulate according to the invention is particularly characterized in that it decomposes in water within a period of time which can be varied. Thus, it is distinguished significantly from objects based on synthetic plastics, which have the propensity to swell on contact with water, but which are not able to go into solution.

The invention is illustrated by means of the following examples which are not intended to be construed as limiting the scope of the invention:

EXAMPLE 1

(Production of a Natural Substance Granulate)

500 g sedge, 175 g casein and 90 g alkali-lignin are mixed with 110 g of a 2% acetic acid in a forced mixer at a temperature of 80° C. and a pressure of 0.1 bar, whereby a pH of about 4 is adjusted. After about 55 seconds, the time-reaction, causing the stereochemical modification, is completed and 125 g glycol are added and the mixture is prepared for addition into the extruder. The pre-processed mixture is then added to the retracting opening of an extruder and brought into a molten state at a temperature of +120° C. Thereafter the molten mass is pressed with a pressure of about 180 bar through the out-let nozzle, whereby a strand is produced providing 900 g of natural substance granulate after processing with a grinding machine. The present natural substance granulate is then processed to corresponding molded articles by means of a thermoplastic injection molding process.

EXAMPLE 2

(Production of a Natural Substance Granulate)

250 g of alkali-lignin and 250 g casein are placed with 600 g of a 2% acetic acid in a retracting opening and are mixed at a temperature of +80° C., whereby a pH of about 5 is adjusted. 400 g of water are removed by evaporation at a temperature of +120° C. from the mixture. Thereafter, 300 g of 20% natural latex and 200 g of sedge are added, whereby a homogenous melt is formed at a temperature of 120° C. and a pressure of 20 bars which, as pointed out in example 1, are pressed through an outlet nozzle by means of a pressure of 100 bars in order to be processed to the corresponding natural substance granulate and furthermore to the molded article. About 1.1 kg of the desired natural substance granulate is obtained which is distinguished by its tensile strength and its stability.

EXAMPLE 3

(Production of a Natural Substance Granulate)

400 g of alkali-lignin and 400 g casein are placed with 800 g of a 2% acetic acid in a retracting opening and are mixed at a temperature of +85° C., whereby a pH of about 4.8 is adjusted. 450 g of natural latex, 50 g of sedge and 15 g of Na-bicarbonate are added to this mixture at a temperature of 105° C. and a pressure of 30 bars, thus forming a homogeneous melt. Thereafter the melt is pressed through an outlet nozzle, as described in example 1, with a pressure of 80 bars and is processed to the corresponding natural substance granulate and thereafter to the molded article. About 2.1 kg of the desired natural substance granulate is obtained. The air entraining agent (Na-bicarbonate) which has been incorporated into the granulate is only activated in the course of the thermoplastic processing, thus permitting the manufacturing of preferably molded articles with thick walls.

EXAMPLE 4

(Production of a Natural Substance Granulate)

640 g sedge, 120 g casein and 100 g alkalilignin are mixed with 150 g of a 3% acetic acid in a forced mixer at a temperature of 85° C. and a pressure of 0.1 bar, whereby a pH of about 4.5 is adjusted. After about 100 seconds, the time reaction is completed and 120 g glycol are added and the mixture is prepared for addition into the extruder. The pre-processed mixture is then added to the retracting opening of an extruder and brought into a molten state at a temperature of +115° C. and then pressed with a pressure of about 430 bars through a flat nozzle. The flat strand, thus obtained, is processed and with a mechanical crushing machine in order to provide 1.1 kg of granulate which is particularly suitable for the manufacturing of hot-molding articles.

We claim:

1. A natural substance granulate produced from lignin and proteinaceous material whereby the lignin is alkali-lignin and whereby the proteinaceous material and the alkali-lignin are the product of a stereochemical modification through treatment with organic acid and wherein the natural substance granulate is thermoplastically processable.

2. The natural substance granulate of claim 1, which is thermoplastically processable to a molded article at a temperature of between about 90° C. and 130° C.

3. The natural substance granulate of claim 1, whereby the alkali-lignin is present in an amount of 15 to 70% by weight.

4. The natural substance granulate of claim 1, whereby the proteinaceous material comprises a proteid.

5. The natural substance granulate of claim 4, wherein the proteid comprises a phosphoproteid.

6. The natural substance granulate of claim 5, wherein the phosphoproteid comprises casein.

7. The natural substance granulate of claim 1, wherein the organic acid is acetic acid.

8. The natural substance granulate of claim 1, further containing 0.1 to 2.5% by weight of an air entraining agent which becomes reactive at a temperature higher than the temperature at which the stereochemical modification takes place.

9. the natural substance granulate of claim 1, further containing 1 to 40% by weight of natural caoutchouc.

10. The natural substance granulate of claim 9, wherein the natural caoutchouc is natural latex.

11. The natural substance granulate of claim 1, further containing 1 to 20% by weight of a plasticiser.

12. The natural substance granulate of claim 1, further containing 0.5 to 50% by weight of mechanically pretreated natural fibers.

13. The natural substance granulate of claim 12, wherein the mechanically pretreated natural fibers are sedge fibers.

14. The natural substance granulate of claim 1, further containing 0.05 to 10% by weight of dye pigments.

15. A molded article comprising the natural substance granulate according to claim 1.

16. The natural substance granulate of claim 1, wherein the proteinaceous material consists of a proteid.

17. A method for the thermoplastic production of molded articles comprising a natural substance granulate according to claim 1, which comprises melting said natural substance granulate and pressing said granulate to a desired form.

18. A method for the production of a natural substance granulate, whereby starting materials comprising alkali-lignin and proteinaceous material are blended with an organic acid at a pH of 3 to 6, and a temperature of between 20° and 90° C. and a pressure between about 0.1 and 60 bar to stereochemically modify the alkali-lignin and proteinaceous material thereafter evaporating excess organic acid at a temperature of 90° to 120° C. and, pressing the molten mass at a pressure of 50 to 500 bars through an outlet nozzle to provide a strand which is processed to a granulate.

19. The method of claim 18, wherein the alkali-lignin is employed as a powder or in a solution.

* * * * *